(12) United States Patent
Badoche Jacquet et al.

(10) Patent No.: US 7,777,638 B2
(45) Date of Patent: Aug. 17, 2010

(54) DEVICE FOR SIGNALING IMMEDIATE RAINFALL FORECASTS

(75) Inventors: Guy Badoche Jacquet, Vaucresson (FR); Michel Dupont, Livoye (FR)

(73) Assignees: RHEA, Nanterre (FR); DNP, St-Georges de Livoye (FR)

( * ) Notice: Subject to any disclaimer, the term of this patent is extended or adjusted under 35 U.S.C. 154(b) by 544 days.

(21) Appl. No.: 10/585,251

(22) PCT Filed: Jan. 5, 2005

(86) PCT No.: PCT/FR2005/000013

§ 371 (c)(1),
(2), (4) Date: Sep. 21, 2007

(87) PCT Pub. No.: WO2005/069183

PCT Pub. Date: Jul. 28, 2005

(65) Prior Publication Data

US 2008/0117041 A1      May 22, 2008

(30) Foreign Application Priority Data

Jan. 5, 2004    (FR) .................................. 04 00030

(51) Int. Cl.
   *G08B 3/00*      (2006.01)
(52) U.S. Cl. .................. 340/691.1; 340/691.6; 340/601
(58) Field of Classification Search ............ 340/539.11, 340/539.13, 539.2, 539.28, 601, 691.1, 691.6; 342/357.06, 357.13; 345/156, 179, 473; 702/3; 709/219

See application file for complete search history.

(56) References Cited

U.S. PATENT DOCUMENTS

| | | | |
|---|---|---|---|
| 6,181,324 B1 | 1/2001 | Lamb et al. ................. 345/156 |
| 6,297,766 B1 | 10/2001 | Koeller ................. 342/357.06 |
| 6,590,529 B2 | 7/2003 | Schwoegler | |
| 6,727,930 B2 | 4/2004 | Currans et al. .............. 715/864 |
| 6,845,324 B2 | 1/2005 | Smith ............................ 702/3 |
| 7,167,906 B2 | 1/2007 | Takenaga .................... 709/219 |

FOREIGN PATENT DOCUMENTS

| | | |
|---|---|---|
| DE | 197 20 591 | 11/1998 |
| WO | 01 80129 | 10/2001 |
| WO | 02 49310 | 6/2002 |

*Primary Examiner*—Van T. Trieu
(74) *Attorney, Agent, or Firm*—Oblon, Spivak, McClelland, Maier & Neustadt, L.L.P.

(57) ABSTRACT

The inventive device comprises telecommunications transceiver interacting with a network for data exchange and a user interface interacting with the telecommunications transceiver for displaying information extracted from received data, wherein telecommunications transceiver is arranged for receiving meteorological data from which a display for the user interface is extracted. Telecommunications transceiver is connected for spontaneously interacting with a station for defining a geographic area and for accessing, in a substantially uniform manner, to a data set containing forecast pluvial/duration pairs which are valid for the geographic area for consecutive periods, the data set being dated by a time marker. The user interface is provided with a range of ordinate display segments, each of which is provided with several display states. The device also comprises a pilot for reacting to the reception of a data set by selectively updating the state of at least certain display segments according to the forecast pluvial/duration pair(s) contained in received data and to the relation between the time marker of the set and the temporal reference of the segments.

28 Claims, 4 Drawing Sheets

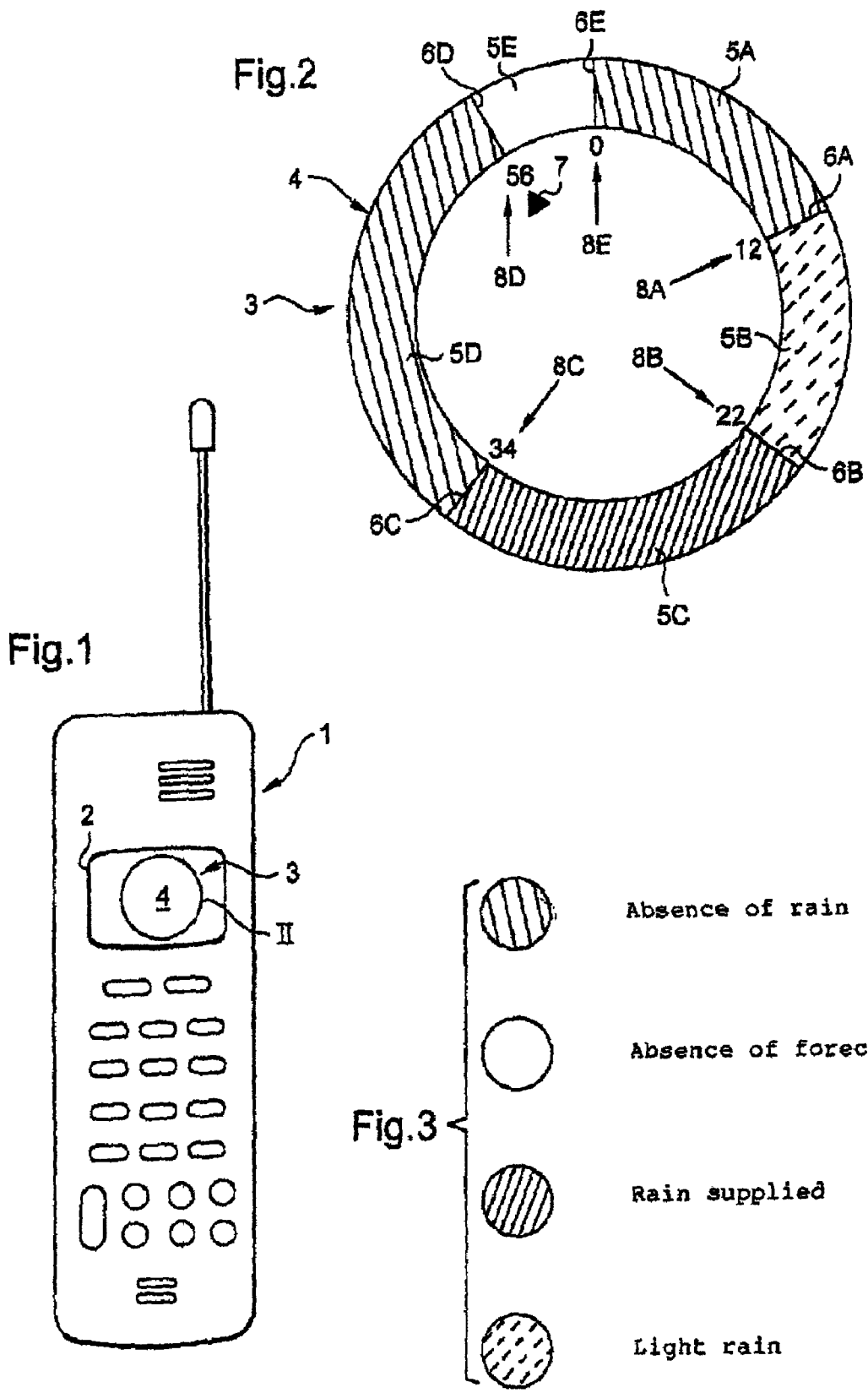

DEVICE FOR SIGNALING IMMEDIATE RAINFALL FORECASTS

BACKGROUND OF THE INVENTION

1. Field of the Invention

The invention relates to meteorological forecasts, and relates more particularly to a device for signalling immediate rainfall forecasts at least to one user.

2. Discussion of the Background

Already known in this field are patent application WO 02/43910, U.S. Pat. Nos. 6,590,529, 6,654,689 or patent WO 92/10804. All propose heavy computer systems giving data upon the request of a user regarding general meteorological forecasting adapted to the location requested and valid on the scale of within the next hour or next few hours. Their user interface is of the conventional electronic type. The use of these systems clearly lacks ergonomics as well as interactivity.

Apart from that, the patent application DE 197 20 591 describes a watch updated by radio on the basis of an atomic clock. The radio transmission also comprises various data, in particular of an environmental nature: warning of catastrophes, or general summary weather forecasts expressed on the scale of one day. Although having a certain interactive advantage, this proposal does not provide more efficient practical data than those broadcast by radio in a general manner.

There is therefore no really interactive, ergonomic tool which makes available to its carrier immediate, reliable rainfall forecasts.

SUMMARY OF THE INVENTION

The present invention improves the situation.

The invention is based on a telematic display device, of the type comprising telecommunication means capable of interacting with a data exchange network, and a user interface capable of interacting with the telecommunication means in order to display information drawn and data received. The telecommunication means are contrived to receive meteorological data, from which is drawn a display on the user interface.

This device is arranged as follows:

the telecommunication means are contrived to interact spontaneously with a station in order on the one hand to define a geographical area, and on the other hand to access substantially regularly a data set comprising rainfall forecast/duration pairs which are valid in the geographical area for consecutive periods, this data set being dated by a time mark generator;

the user interface has a field of ordered display segments each capable of being displayed in plural states, and the device comprising a pilot capable of reacting to the reception of a data set by updating the state of at least some of the display segments, selectively according to the rainfall forecast/duration pairs which the data received contain and according to the relation between the time mark generator of this set and a temporal reference of the segments.

The invention also offers a method which will be defined below.

BRIEF DESCRIPTION OF THE DRAWINGS

Further features and advantages of the invention will appear from reading the description below with reference to the attached drawings, in which:

FIG. 1 is a schematic representation of a cell phone equipped with a device for signalling rainfall forecasts;

FIG. 2 is an enlarged view of the screen of the phone of FIG. 1 according to the detail identified by the insert II, according to an embodiment where the user interface of the signalling device has a dial with a circular contour;

FIG. 3 is a schematic representation of the different meteorological indications capable of being shown on the dial of the user interface

DETAILED DESCRIPTION OF THE INVENTIONS

The advantage of weather forecasts no longer needs to be demonstrated. The mass media have for a long time incorporated in their communications information concerning the next day's forecast or even a forecast of the following days, within a given country or region.

The "immediate" forecast is a weather forecast for a very short term, lasting for a few minutes to two or three hours maximum. It is therefore based essentially on the current observation of the weather and in the first place on data from meteorological radar equipment. It relates to the forecast of rainfall or associated phenomena (tornadoes, storms), is more recent and forms a field of extension of meteorology.

As the Applicants have observed, the need is felt both with individuals and with certain professionals whose activity is directly affected by the weather, to have immediate access to information on the weather predicted in a restricted geographical area including for example their place of activity and within a relatively brief, predetermined time interval, such information being compatible with the precision of localisation and with data relating to the "immediate" forecast of rainfall.

The Applicants have also observed that the modern measuring, calculating and communication devices permit a virtually permanent and instant supply of such information.

They have also observed that there is a great difference in variability between the conventional weather forecasting parameters (temperature, cloudiness, atmospheric pressure) and rainfall. Thus the conventional weather forecasting parameters vary slowly (i.e. over durations of several hours) and are relatively uniform over extended geographical areas (several tens, or even hundreds of $km^2$).

On the other hand, rainfall itself may vary rapidly (over durations of the order of a few minutes) and are not uniform except in extremely restricted geographical areas (of the order of a $km^2$, or a few $km^2$). Consequently, it is very difficult to predict these with much certainty within restricted geographical areas, compared to conventional weather forecasts.

The device which will now be described makes use of these observations.

Figure 6:
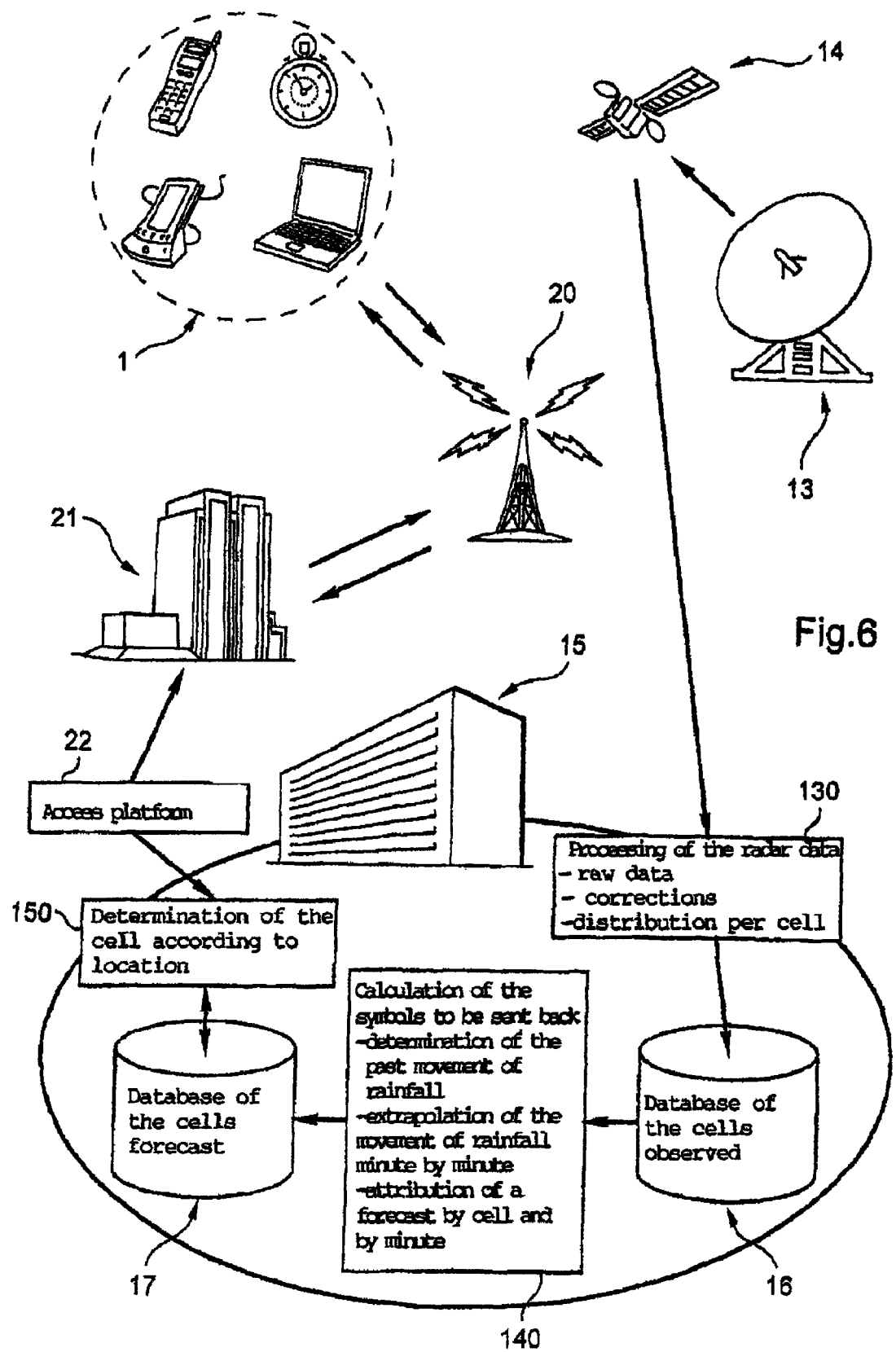
FIG. 6 is a schematic representation of a communications network making possible the operation of a device for signalling rainfall forecasts such as is shown in the preceding figures.
Figure 7:
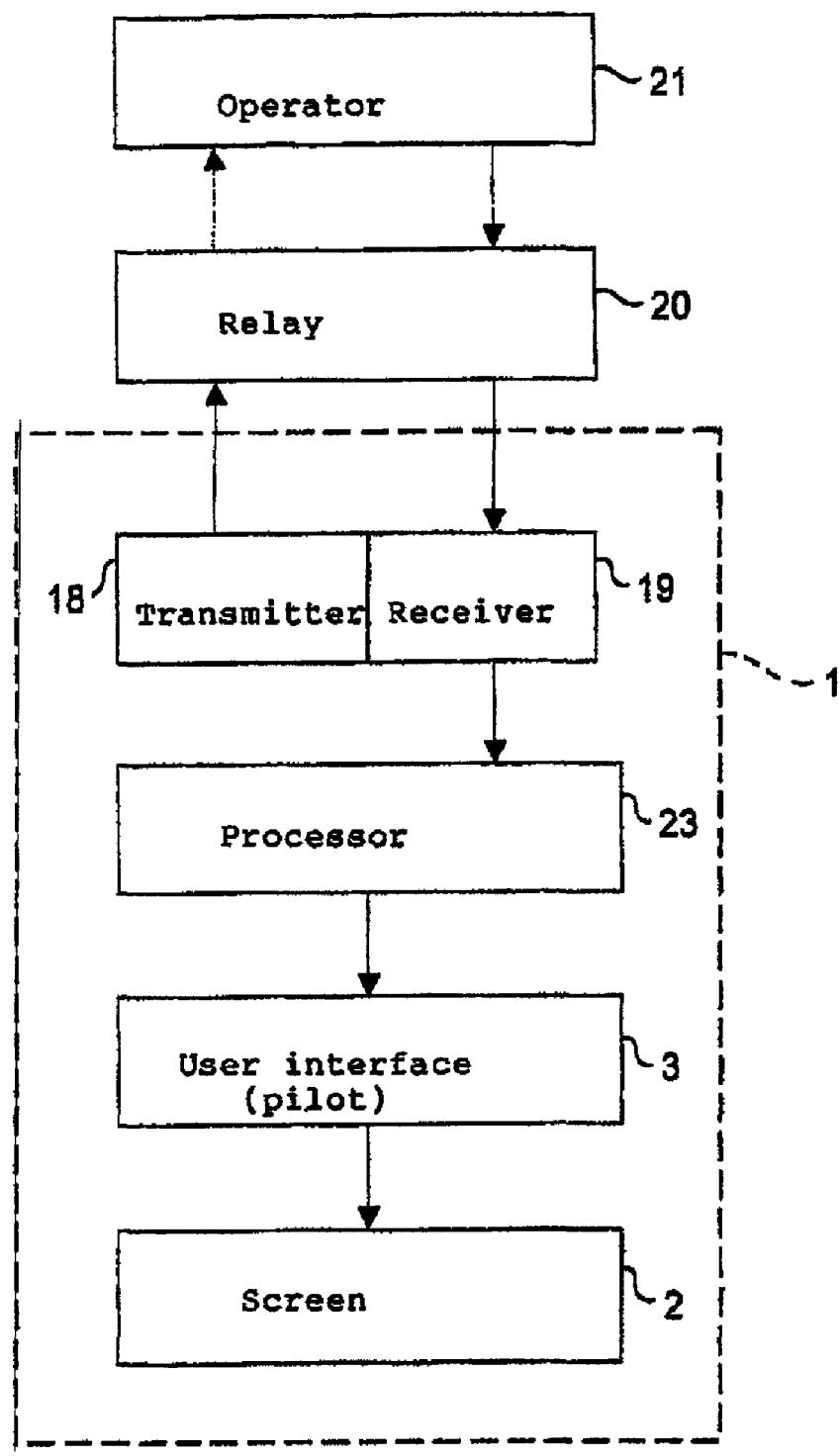
FIG. 7 is a schematic representation of a communications system intended to make possible the display of rainfall forecasts supplied by the network of FIG. 6.

FIG. 1 shows an electronic device 1 comprising a remote communication system. It involves in this case a cell phone, but might just as easily involve, as is shown in FIG. 6, a personal computer, either fixed or portable, a personal digital assistant (PDA) or even a watch equipped with a remote communication system. Although this is not shown, it might also involve a control apparatus incorporated into a navigational system.

As is shown in FIG. 6, this apparatus 1 is connected to a communication network, wireless or otherwise, with which it exchanges information, as will be described below.

This apparatus 1 has a screen 2, on which can be displayed a certain number of data, including immediate rainfall forecasts relating to a geographical area in which the apparatus 1 is located (or was located) at a given instant.

The protocol applied in order to locate the apparatus geographically and to communicate thereto the data describing rainfall forecasts will be described below. For the moment, it is assumed that the apparatus has at any moment or regularly rainfall forecasts for a restricted geographical area which are relevant to the wearer/carrier.

The apparatus 1 has an integral user interface comprising a pilot 3, provided to effect display on the screen 2 of the rainfall forecasts in a particular form.

The display on the screen 2 comprises a field 4 or "chronological dial" representing a predetermined time interval (in this case one hour).

Figure 4:
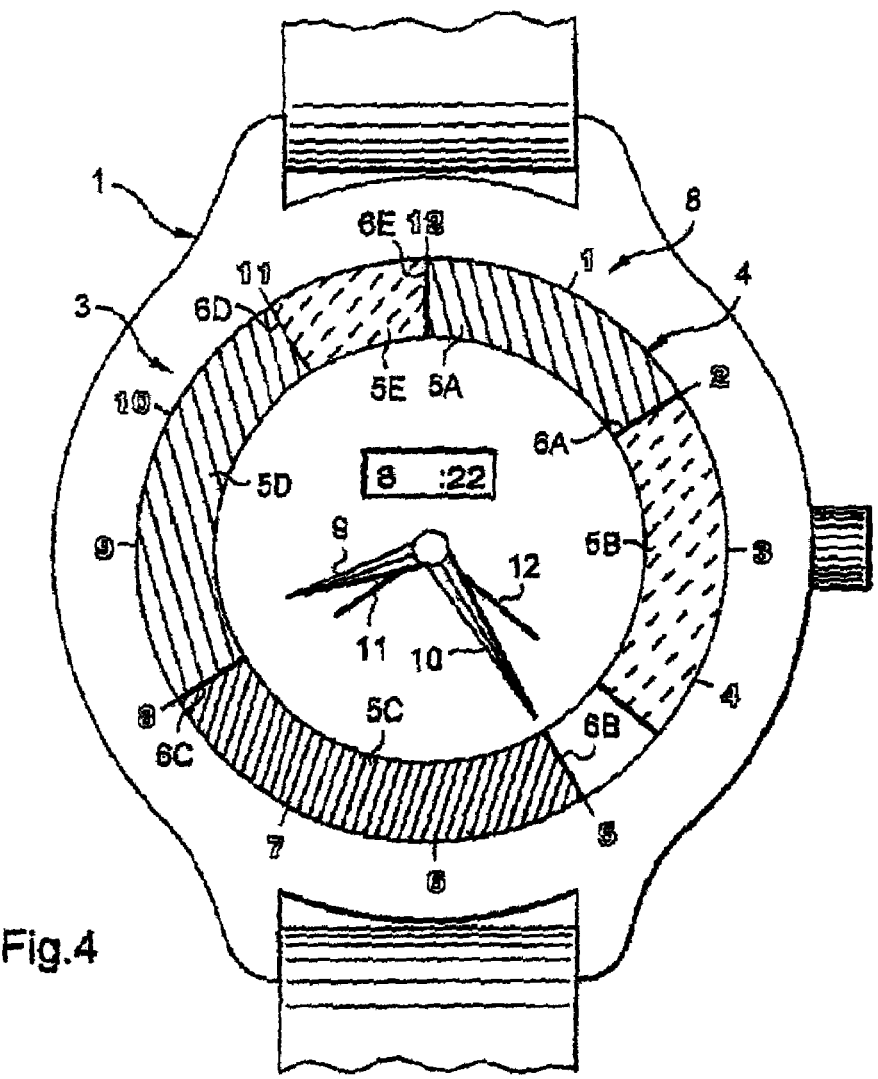
FIG. 4 is a plan view of a watch equipped with a device for signalling rainfall forecasts.

According to an embodiment shown in FIGS. 2 and 4, the dial 4 has a circular contour, in the sense that this contour is looped back on itself, in accordance with the cyclical nature of the time interval being considered. The contour of the dial 4 has, in the example shown in FIGS. 2 and 4, a round profile, but this profile could also be oval, square, rectangular, polygonal, or more generally a closed profile selected according to the style adopted or the space available on the screen 2 of the apparatus 1.

Figure 5:
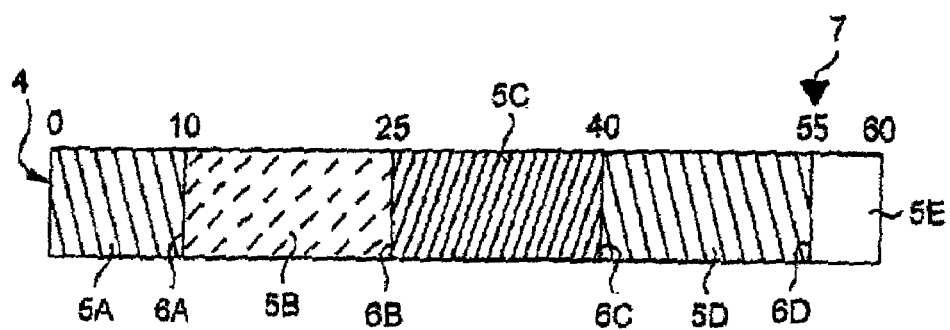
FIG. 5 is a partial schematic representation of a device for signalling rainfall forecasts comprising a user interface whose dial is linear.

By way of modification, the dial 4 could also be linear, as is shown in FIG. 5.

The dial 4 is capable of being subdivided into adjacent sectors 5A, 5B, 5C, 5D, 5E. These form a field of ordered display segments (5A to 5E) each capable of a display in plural states. As will be seen, each sector has a corresponding rainfall forecast different from those of the sectors which are immediately adjacent. The sectors 5A, 5B, 5C, 5D, 5E can be separated from one another by limits 6A, 6B, 6C, 6D, 6E (in this case rectilinear) marked chronologically on the dial 4. These limits may correspond to the instants of changes forecast in rainfall conditions. In other words, the sectors or segments have a temporal reference and, in this example, a graduation 8.

In other words, each sector 5A, 5B, 5C, 5D, 5E represents a temporal sub-interval which may be scanned on the dial 4 at the first glance. In the examples illustrated in FIGS. 2 and 4, where the dial 4 is circular (round profile), the sectors 5A, 5B, 5C, 5D, 5E are angular sectors centred relative to the dial, whereas in the example shown in FIG. 5, where the dial is linear, the sectors 5A, 5B, 5C, 5D, 5E take the form of aligned rectangular display windows.

Furthermore, the interface 3 comprises means of displaying within at least one sector 5A, 5B, 5C, 5D, 5E information—when available—representing a predetermined rainfall forecast for the temporal sub-interval corresponding to that sector 5A, 5B, 5C, 5D, 5E.

In the example described here, the segments are composed of liquid crystals. The pilot 3 may control each segment to display three or four different states. In this example, these states are: a light "plain", or light continuous coloration of the segment; short, fine lines in the segment; a dark "plain", or dark continuous coloration of the segment; an absence of display in the segment (this coloration is conventionally supposed to be white in FIG. 3).

The first state may correspond to a forecast of the absence of rain, signifying for example a sunny or cloudy weather but without rain. The second state may correspond to a forecast of fine rain or light rain, signifying for example cloudy, threatening weather, light rain or even drizzle. The third state may correspond to a forecast of heavy or intense rain, signifying for example continuous rain or showers. Finally, the fourth state may correspond to an absence of rainfall forecasts, signifying for example that the communication is cut off or that the rainfall forecasts are not available.

Obviously, the states of display indicated are given by way of example, and other graphics corresponding to the desired interpretation can be used, so that the user can immediately distinguish the forecasts one from another. The person skilled in the art may conceive of numerous modifications in the number and display of the states, in order to indicate clearly the rainfall forecasts for a given segment. Thus, for a segment displaying the state corresponding to an absence of rain, continuous lines could be displayed perpendicular to the edge of the segment to suggest the sun's rays.

In general, it is suitable for the display to form a field of ordered display segments, each capable of displaying plural states. This display can be effected by various known means such as liquid crystals for example. This display can also use organic light emitting diode (OLED) technology.

In the embodiment shown in FIG. 2, the segments are displayed relative to a temporal reference corresponding to an origin of the field. The ordered display of the segments is therefore effected from a segment of origin, which is in this case the upper vertical radius. A mobile cursor 7 shows the moment of forecast (the instant at which the raw radar data used for the immediate rainfall forecast were observed), and also the origin, but in an indirect manner in this embodiment (it would be possible furthermore to consider that the origin of time is the moment of the forecast).

Digital displays 8A, 8B, 8C, 8D, 8E can also be provided opposite limits 6A, 6B, 6C, 6D, 6E (or some of these). They make it possible to display the cumulative duration corresponding to the limit which they abut.

The current forecast is displayed in the segment 5A corresponding to the temporal reference; and the segment preceding it displays a state corresponding to an absence of forecast. This state is distinctive in order to make it possible to determine the date of the last reception.

In the embodiment of FIG. 2, the field or dial 4 has a relative temporal meaning, defined relative to the present instant (the origin). Display is in this case representative, at any moment, of the forecast for the hour (i.e. 60 minutes) to come.

Thus, in the example shown, the raw radar data used upon the last reception were observed 4 minutes ago (the mobile marking being opposite the reference 8D indicating "56"), and the rainfall forecasts for the hour to come to be counted from the instant of consultation are as follows:

up to 12 minutes from now: absence of rain within the time interval between 12 and 22 minutes from now: fine rain or light rain;

within the time interval between 22 and 34 minutes from now: heavy or intense rain;

within the time interval between 34 and 56 minutes from now: fine rain or light rain again; and within the time interval between 56 and 60 minutes from now: absence of forecast.

In another embodiment, shown in FIG. 4, the display is provided to indicate also the current hour, in the manner of a wrist-watch. The present instant is therefore mobile on the dial. The rainfall forecasts remain displayed for the hour to come.

The display 4 may comprise a pair of conventional hands 9, 10. In this embodiment, the time mark generator is indicated by a second pair of hands 11, 12 which are thinner than the hands 9 and 10 respectively in order to be better distinguished by the user. The hands 11, 12 may indicate the instant at which the raw radar data were observed which are used for the immediate rainfall forecast, or the instant of refreshment of the forecasts displayed (particularly if this is significant).

In the example shown, the hands 9 and 10 indicate 8.25 and the hands 11 and 12 indicate 8.22. This means that the apparatus 1 received at the last update data comprising a time mark generator indicating 8.22, or 3 minutes ago. This time is also indicated by a display with a digital display window in the centre of the dial. The rainfall forecasts contained in these data are as follows:
- from 8.25 to 8.40: heavy or intense rain;
- from 8.40 to 8.55: absence of rain;
- from 8.55 to 9.00: fine or light rain;
- from 9.00 to 9.10: absence of rain;
- from 9.10 to 9.22: fine or light rain again;
- from 9.22 to 9.25: absence or blocking of forecast (to mark that the forecast previously displayed from 8.22 to 8.25 has become obsolete).

The apparent update period of the display is in this case of the order of 5 minutes, but could be of the order of one minute as in the example in FIG. 2. This updating is brought about by the pilot 3, either by a new reception of meteorological data or by the expiry of a determined duration.

This modification may receive other elements described with respect to FIG. 2. For example, the dial 4 may, apart from the permanent graduation 8, make possible the display of numbered references (not shown) indicating the time values corresponding to the corresponding limits 6A, 6B, 6C, 6D, 6E.

Conversely, FIG. 4 shows other elements, such as the central digital display window, which are also applicable to the case of FIG. 2.

Furthermore, the example shown in FIG. 4 is a wrist-watch, but could also be any other system indicating the time: watch, alarm clock, wall clock or any other apparatus having the function of telling the time.

On another level, it is noted that the origin (current time) is fixed in FIG. 2 and mobile with display of the current time in FIG. 4. A conceivable modification of FIG. 2 would have the origin (current time) mobile according to a selected criterion, e.g. the current hour (without the minutes). In the same way, in a variant of FIG. 4, it is conceivable to have the origin (current time) fixed, e.g. with purely digital display of the current time.

The example shown in FIG. 5 differs from the preceding examples of FIGS. 3 and 4 by the fact that the dial 4 is linear.

The display of data can be effected for the hour to come, at any instant or at the instant of consultation—as in the example of FIG. 2—or for the current hour, as in the example of FIG. 4.

In this second hypothesis, a mobile cursor (not shown) could be provided in order to indicate on the dial 4 the current time, and an additional cursor could indicate the time at which the raw radar data were observed which are used for the most recent immediate forecast of the rainfall.

In the example shown in FIG. 5, the current instant is indicated by the left-hand end of the dial 4, bearing the reference "0". A cursor 7 here also designates an origin segment, to the right of the reference "55". Taking into account the cyclical nature of the display, the cursor therefore indicates that the raw radar data were observed 5 minutes before the current instant.

The forecasts for the hour to come are as follows:
- 10 minutes from now: absence of rain;
- In the time interval comprised between 10 and 25 minutes from now: fine rain or light rain;
- In the time interval comprised between 25 and 40 minutes from now: heavy or intense rain;
- In the time interval comprised between 40 and 55 minutes from now: fine rain or light rain again; and
- In the time interval comprised between 55 and 60 minutes from now: absence of forecast.

The operations (or "protocol") allowing the apparatus 1 to have rainfall forecasts to display according to its geographical location will now be described by way of example with the aid of FIG. 6.

A forecast centre 15 receives meteorological data periodically, by link to a satellite 14, from a network 13 of meteorological radars (e.g. the ARAMIS network—Radar application to infra-synoptic meteorology—of Météo France). These data are relative to the radar observations of rainfall for the whole of a region divided into geographical areas or "cells".

Each cell is formed of a square parcel of a region being observed, having a surface area of about 1 km$^2$.

Upon each reception, the forecast centre 15 processes the data in an operation 130 in order to eliminate any anomalies in the signal resulting from interference with obstacles such as mountains, hills, tall buildings, or abnormal scattering of the signal in the atmosphere. These data are then associated in a first database 16 corresponding with an identifier for the cell concerned each time.

In an operation 140, these data are then compared to the data received previously, and a linear extrapolation makes it possible to forecast the development of rainfall for the hour to come. More particularly, the data processed are used to determine the past movement of the rainfall observed by comparison of their last observed position to their preceding positions. Assuming that, for the sake of simplicity, the movement of the rainfall is uniform in the hour to come, linear extrapolation makes it possible to forecast the movement to come of the rainfall for each of the 60 or 75 minutes to come and thus to allocate to each cell a predicted level of rainfall.

In the example described, this evolution is characterised by the allocation of a state of rainfall to each cell of the region being studied, each state corresponding to the states described above. The state is characterised by a determined (data) symbol which signifies for example: absence of rain, fine or light rain, heavy or intense rain, or no forecast available. The linear extrapolation can be used to carry out forecasts for up to three hours to come.

The data are therefore assembled per adjacent minute for each cell to form forecast data. Thus forecast data are obtained for each cell and for the hour to come, consisting of rainfall forecast/duration pairs, each with a symbol. In these pairs, the duration is one minute and they are ordered in forecast data by consecutive periods of one minute. These forecast data are therefore stored in a second database 17, with a time mark generator which can indicate the hour when the raw radar data were received or even the time of transmission of the raw data by the radars or any other time mark generator with which it is possible to characterise the forecast data.

In the example comprising four display states, the rainfall forecast/duration pairs are reduced to a sequence of "symbols", ordered in time, each of which can be represented by only two bits (or if desired an octet). It suffices that one of the symbols, e.g. the first, is accompanied by an indication of the (exact) time of the forecast. This results in a reduced calculation load for the forecast proper. This is significant in that the calculation must be able to be carried out for a sufficiently large number of different cells (in this case 1 km$^2$); it is also significant in so far as the transmission of data must be able to be carried out without overloading the existing networks to a large number of users; finally, on the user side, it is possible to make do with a relatively simple processor, which is inexpensive and has a low electricity consumption, having considerable residual capacity for display management. In this respect, in the embodiment described, the interface "pilot" is considered at least partly incorporated in the memory of the processor.

The forecast data of the base 17 can be refreshed, for each cell, at the frequency of the raw radar data. These data are refreshed according to a theoretical period of the order of 5 minutes. As has been seen in the example, a set of refreshed data is defined with a resolution of the order of one minute. Although not imperative, a temporal resolution several times greater than the period of refreshment is advantageous, e.g. in order to compensate for any erratic refreshment defects.

We will now consider telecommunication.

The apparatus 1 (cell phone, computer, watch, personal digital assistant etc.) comprises telecommunication means which comprise a transmitter 18 and a receiver 19. These means interact spontaneously with a communication relay 20 in the form of a station (formed of antennae on the ground or a constellation of satellites) in order to obtain, inter alia, forecast data. The relay or station 20 obtains these data from a fixed telecommunications operator 21 connected to the forecasting centre by an access platform 22.

The transmitter 18 sets up communication with the relay 20 in a systematic (i.e. independently of any action of the user or users).and periodical manner. The data transmitted to the apparatus 1 relate to a cell in which the apparatus is located at the moment of reception of these data. This cell can be determined in various ways in one operation 150.

In the case where the apparatus 1 is a cell phone or apparatus communicating with a wireless telephone network, the apparatus 1 can be located relative to the antenna(e) with which it communicates. The station 20 then defines the cell (if need be by cooperation with its neighbours) and hence the geographical area for the data being sent to the apparatus 1. In other words, it is possible to calculate the position of the apparatus 1 by trigonometry when plural relays or stations 20—with known positions—receive a signal from the apparatus 1 simultaneously.

The apparatus 1 can therefore indicate the geographical area to the station 20 by itself. For example, it may be equipped with a GPS unit or the like and transmit a data item representing its position (in the applicable field of uncertainty) to the station 20 which consequently sends data back to the apparatus.

Other modifications are conceivable in order to transmit the geographical position data. For example, other means than those described above make it possible to locate a telephone apparatus. Moreover, the user may himself indicate a position through the telephone keypad, or by other means, in particular if his position is not changing much. One or more positions memorised in the apparatus may also be used.

The position may be redefined at each transmission or from time to time.

The operator 21 then interrogates the second database 17 via the access platform 22, selects the rainfall forecasts relating to the cell corresponding to the position, for the 60 or 75 minutes to come, before returning corresponding rainfall data to the apparatus 1 via the relay 20 and the receiver 19.

Thus, the data which the apparatus 1 receives from the station 20 are formed of blocks of data relating to forecast data in the base 17 as well as of the time mark generator which is associated therewith and designates one of the blocks. Since the forecast data are rainfall forecast/duration pairs where the duration is one minute, assembled by adjacent minutes, the data blocks consequently relate to short consecutive periods of rainfall forecast whose duration is one minute.

Since the forecasts derived from radar data relate to a period of up to three hours, the data blocks can consequently relate to an overall duration of three hours. In practice, the overall duration of the data blocks is about 75 minutes. This makes it possible to have permanently forecasts for the hour to come, even if updates fail at the apparatus 1.

Once received, the data are then processed by a processor 23 and stored in a memory, and the pilot 3 then controls their display on the screen 2. The processor 23, which is connected to the transmitter 18 and to the receiver 19, is then programmed to control periodically (in practice every minute) communication between the transmitter 18 and the relay 20 in order to receive data.

In the case of a cell phone equipped with a SIM card, the processor 23 may be that of the SIM card, adapted to the processing of rainfall data by a suitable programming of the SIM-Toolkit.

Furthermore, WAP or i-mode (registered Trade Mark) protocols make it possible to manage the display and communications with the platform 22 jointly.

The communication means interact regularly and spontaneously with the station 20. The frequency of these interactions is of the order of one interaction every 5 minutes, which corresponds in this case to the refreshment frequency of the radar data. In fact, the frequency of interactions may be equal to the refreshment frequency of the radar data, less than this, or even more in certain cases.

Obviously, the frequency of interaction is not to be interpreted in the sense of a strict periodicity. In fact, the interaction may be initiated either by the communication means (e.g. after the expiry of a given duration) or by the station 20 (e.g. upon receiving new radar data) according to a frequency of the order of that described above.

It is conceivable to access these data more frequently than once every 5 minutes in order to create a redundancy of data with which any problems of transmission may be remedied. Thus, access about every minute is conceivable. The combination of this redundancy of information and the use of a field of forecasts widened to 75 minutes ensures that the user will have permanent forecasts.

The apparatus is therefore capable:
  a. of interrogating a remote station in order to receive meteorological data therefrom,
  b. displaying locally a representation of these meteorological data.

The stage a. is carried out spontaneously and repetitively in a manner which makes it possible to define a geographical area and to have access substantially regularly to a data set comprising rainfall forecast/duration pairs which are valid in the geographical area for consecutive periods, this data set being dated by a time mark generator.

For its part, the stage b. comprises both updating of the display segments ordered according to a field, and each being capable of being displayed in plural states selectively according to the rainfall forecast/duration pairs which the data received contain and according to the relation between the time mark generator of this set and a temporal reference of the segments. This can be controlled by the interface 3 immediately after each communication.

Obviously, it is possible for the apparatus to be moving. Since the rainfall forecasts which it displays at any instant are the latest ones received, it is possible for a lag to exist between the cell in which it was at the time of the preceding reception and the cell in which it is located upon consultation by the user. However, as mentioned above, this lag does not appear to be a problem, since the refreshing of data is systematic and frequent.

The miniaturisation of wireless communication systems and of re-charger batteries places within reach of the person skilled in the art the concrete realisation of a transmitter/receiver of reduced size and which is still sufficiently powerful to equip in particular a wrist-watch.

In the hypothesis where the demands of users in terms of autonomy would not make it possible to realise a totally independently operating apparatus, it is possible to make this a slave to a secondary apparatus equipped with a sufficiently powerful transmitter/receiver. For example, it is possible to equip a wrist-watch with a communication system of reduced power whilst backing the watch up by a cell phone equipped with a more powerful communication system. Infrared communication systems or those of the Bluetooth® type make it possible to realise such a kit.

What has just been described applies as a whole for mobile-type apparatuses. However, the display principle outlined above remains valid for fixed apparatuses such as public clocks or personal domestic computers, for which calculation of the geographical position is unnecessary, and only the refreshment of the data is necessary for the unchangeable geographic cell in which the apparatus is located.

Obviously, the protocol which has just been described applies as a whole to mobile-type apparatuses. However, the display principle outlined above remains valid for fixed apparatuses such as public clocks or personal domestic computers, for which calculation of the geographical position is unnecessary, and only the refreshment of the data is necessary for the unchangeable geographic cell in which the apparatus is located.

The permanent display of forecasts on a wrist-watch is particularly advantageous, since it makes possible the creation of new daily habits for the wearers of watches, for which the consultation of the rainfall forecasts should become a reflex in the same way as consulting the time.

This new habit is made technically possible by virtue of the refreshing of forecasts displayed at the refreshment frequency of the raw radar data.

As will have become apparent, the device described brings into action:
- telecommunication means contrived to receive from a remote data source, independently of any action by the user, information describing rainfall forecasts over a predetermined time interval which are valid in a geographical area including the estimated placing of the device and updates with each reception, and
- a user interface contrived on the one hand to present in a corresponding field with a predetermined time interval the rainfall forecasts described by the information received and on the other hand to refresh the presentation of the forecasts upon each reception.

Since the forecasts are displayed independently of any action by the user, it is not necessary for the latter to carry out prior interrogation of the remote data source. The consultation of the forecasts is on the contrary immediate.

According to one embodiment, the user interface is contrived for the permanent display of rainfall forecasts. In this manner, the user may consult the forecasts with a simple glance.

Furthermore, the telecommunication means can be contrived for periodical reception of data describing the rainfall forecasts with a period of less than about 5 minutes, and which could go as low as 1 minute. In this manner, the user has access to virtually permanently refreshed data.

Furthermore, it may be carried out in such a manner that the predetermined time interval does not exceed three hours. In practice, this interval is preferably about one hour or slightly more.

The user interface preferably comprises a chronological dial representing a predetermined time interval, this dial being capable of being divided into adjacent sectors, each sector representing a temporal sub-interval which can be marked on the dial, the sectors being separated from one another by limits marked chronologically on the dial, the user interface further comprising means of displaying within at least one sector information representing a predetermined rainfall forecast for the temporal sub-interval corresponding to this sector.

The consultation by the user is particularly ergonomic, the visualisation of the forecasts being immediate.

The chronological dial is for example representative of a time interval of one hour. It may be an hour having as its origin the current instant or the current hour, comprised between two successive whole days. In the latter case, a mobile cursor can be provided to indicate on the dial the time at which the raw radar data were observed which were used for the immediate forecast of rainfall. In this manner, the user may detect an interruption (e.g. accidental) of the reception of data. He is also capable of evaluating the relevance of the forecast, by taking into account the deterioration in the quality of forecast of a rainfall as he moves away from the time of the forecast.

The dial has for example a circular contour, each sector being an angular sector centred relative to the said contour. As a modification, the dial may, on the contrary, be linear.

As to the forecasts of rainfall, they are for example of one of the following types: absence of rain, fine or light rain, or heavy or intense rain.

The absence of rain can be indicated by a continuous light colour, fine or light rain by lines, and heavy or intense rain by a continuous dark colour.

The invention proposes secondly a clock or watch equipped with a dial giving the time and equipped with a signalling device such as proposed above, whose user interface is contrived to present the rainfall forecasts on the dial.

Taking into account the banality of the gesture consisting of consulting the time on a clock or watch, it is also easy to create a new reflex for the consultation of rainfall forecasts on a similar object to that which already equips the majority of the population.

This makes it possible to signal to at least one user, by means of a signalling device equipped with a user interface, rainfall forecasts over a predetermined time interval, by the systematic repetition of the following stages:
- determine a time interval,
- locate a geographical area in which the signalling device is located,
- search a database for rainfall forecasts which are valid for the time interval and in the said geographical area,
- communicate these data to the signalling device and
- display the rainfall forecasts by means of the user interface.

The repetition of the stages takes place periodically, the period being for example less than about 5 minutes, and may be as low as 1 minute.

The invention claimed is:

1. A telematic display device, comprising:
    telecommunication means for interacting with a data exchange network; and
    a user interface configured to interact with the telecommunication means to display information drawn and data received,
    wherein the telecommunication means are configured to receive meteorological data, from which is drawn a display on the user interface;
    the telecommunication means interacts spontaneously with a station independently of any action by a user to define a geographical area, and to receive substantially regularly a data set comprising rainfall forecast/duration pairs, which are valid in the geographical area for consecutive periods, said data set being dated by a time mark generator;
    the user interface includes a field of ordered display segments, each capable of being displayed in plural states; and
    the display device further includes a pilot configured to react to receiving the data set by updating a state of at least one of the display segments, selectively according to the received rainfall forecast/duration pairs and according to a relation between the time mark generator of said data set and a temporal reference of the segments.

2. A device according to claim 1, wherein the pilot processes the segments relative to a segment of origin which indicates the temporal reference, modulo a selected periodicity, and wherein upon receiving the data set, said pilot updates at least a display segment corresponding to new data.

3. A device according to claim 1, wherein the segment preceding that of a current forecast is subject to a distinctive display.

4. A device according to claim 1, wherein the user interface also comprises a display element of a time and the pilot is further configured to update said display element according to the time mark generator.

5. A device according to claim 1, wherein the user interface comprises a cursor to designate one of the segments.

6. A device according to claim 1, wherein the user interface further comprises a dial for the analog display of a present time, wherein the ordered field of display segments is a counterpart of the dial.

7. A device according to claim 5, wherein the cursor has a minute hand actuated according to the time mark generator.

8. A device according to claim 1, further comprising a memory for storing at least some of the data received.

9. A device according to claim 1, wherein the data set received comprises a sequence of data blocks or symbols relating to short consecutive periods of rainfall forecast, the time mark generator relating to one of said blocks and, upon each reception, the user interface pilot is configured to make a state of the segments correspond to respective contents of at least some of the data blocks.

10. A device according to claim 9, wherein a short period associated with each of the data blocks is about 1 minute.

11. A device according to claim 9, wherein the sequence of data blocks of one set relates to an overall duration at least equal to about three hours.

12. A device according to claim 11, wherein an overall duration is about 1 hour.

13. A device according to claim 1, wherein the field of segments extends in a substantially linear form.

14. A device according to claim 1, wherein the field of segments extends in a substantially circular form.

15. A device according to claim 1, wherein the telecommunication means interacts with the station to define the geographical area.

16. A device according to claim 1, wherein a definition of the geographical area is determined at least partly by data transmitted by the telecommunication means.

17. A device according to claim 1, wherein the telecommunication means interacts with the network according to a period longer than 1 minute.

18. A device according to claim 17, wherein the period is about 5 minutes.

19. A device according to claim 1, wherein the rainfall forecasts represent the following rainfall states: absence of rain, fine or light rain, heavy or intense rain.

20. A device according to claim 19, wherein an absence of rain is displayed on the user interface by a continuous light colour, the fine or light rain by lines, and the heavy or intense rain by a continuous dark coloration.

21. A device according to claim 1, wherein the geographical area has a dimension substantially equal to 1 km$^2$.

22. A method of telematic signalling, comprising:
    interrogating a remote station to receive meteorological data therefrom;
    displaying locally a representation of the received meteorological data, wherein
    said step of interrogating is carried out spontaneously and repetitively independently of any action by a user in a manner so as to define a geographical area and to receive substantially regularly a data set including rainfall forecast/duration pairs, which are valid in the geographical area for consecutive periods, said data set being dated by a time mark generator; and
    said step of displaying comprises both updating of display segments ordered according to a field, wherein each display segment is capable of being displayed in plural states selectively according to the received rainfall forecast/duration pairs and according to a relation between the time mark generator of said data set and a temporal reference of the segments.

23. A method according to claim 22, further comprising repeating said steps of interrogating and displaying periodically, based on a period being of greater than 1 minute.

24. A method according to claim 23, wherein the period is about 5 minutes.

25. A method according to one claim 22, wherein said step of displaying comprises displaying a distinctive state for a segment which precedes that of a current forecast.

26. A method according to claim 22, wherein said step of displaying comprises updating, according to the time mark generator, a display element of a time which the user interface comprises.

27. A method according to claim 22, further comprising displaying on the user interface a time relating to the display of the meteorological data according to a time mark generator and the temporal reference of the segments.

28. A method according to claim 22, wherein said step of interrogating comprises receiving the data set which includes a sequence of data blocks or symbols relating to short consecutive periods of rainfall forecasting, the time mark generator relating to one of the blocks, and at each update, said step of displaying comprises placing in correspondence of a state of the segments with the respective contents of at least one of the data blocks.

* * * * *